United States Patent
Watanabe et al.

(10) Patent No.: US 8,124,276 B2
(45) Date of Patent: Feb. 28, 2012

(54) BATTERY STRUCTURE, ASSEMBLED BATTERY, AND VEHICLE MOUNTING THESE THEREON

(75) Inventors: Kyoichi Watanabe, Yokohama (JP); Takaaki Abe, Yokohama (JP); Takamitsu Saito, Yokohama (JP); Osamu Shimamura, Yokohama (JP); Kenji Hosaka, Yokosuka (JP); Hajime Sato, Yokohama (JP); Hideaki Horie, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 953 days.

(21) Appl. No.: 12/085,216

(22) PCT Filed: Nov. 9, 2006

(86) PCT No.: PCT/JP2006/322350
§ 371 (c)(1),
(2), (4) Date: May 20, 2008

(87) PCT Pub. No.: WO2007/060841
PCT Pub. Date: May 31, 2007

(65) Prior Publication Data
US 2009/0136844 A1 May 28, 2009

(30) Foreign Application Priority Data
Nov. 24, 2005 (JP) .................. 2005-339523

(51) Int. Cl.
*H01M 2/16* (2006.01)
*H01M 6/48* (2006.01)
*H01M 10/05* (2006.01)
*H01M 10/18* (2006.01)

(52) U.S. Cl. ............ 429/210; 429/152; 429/249
(58) Field of Classification Search .............. None
See application file for complete search history.

(56) References Cited

U.S. PATENT DOCUMENTS

| 4,275,130 A | 6/1981 | Rippel et al. |
| 5,290,414 A * | 3/1994 | Marple ............ 204/252 |

(Continued)

FOREIGN PATENT DOCUMENTS

| CN | 1494178 A | 5/2004 |
| EP | 1487034 A2 | 12/2004 |
| EP | 1744393 A2 | 1/2007 |
| JP | 2000-100471 A | 4/2000 |

(Continued)

OTHER PUBLICATIONS

Marsh et al., "Bipolar lithium-ion battery development", Journal of Power Sources 65, 1997, vol. 65(1), pp. 133-141.

*Primary Examiner* — Jonathan Crepeau
(74) *Attorney, Agent, or Firm* — Foley & Lardner LLP

(57) ABSTRACT

A bipolar battery includes: a bipolar electrode composed, by forming a positive electrode active material layer 12 an one surface of a current collector and forming a negative electrode active material layer 13 on the other surface; and a separator 14 composed to be stacked alternately with the bipolar electrode, wherein, in a single cell layer 15 composed by including the positive electrode active material layer 12, the separator 14 and the negative electrode active material layer 13, which are adjacent to one another, a thickness of the separator 14 is 0.68 times or more to less than 1.0 times a thickness of the positive electrode active material layer 12, and is 0.68 times or more to less than 1.0 times a thickness of the negative electrode active material layer 13.

11 Claims, 11 Drawing Sheets

U.S. PATENT DOCUMENTS

| | | |
|---|---|---|
| 7,220,516 B2 | 5/2007 | Oosawa et al. |
| 7,759,005 B2 * | 7/2010 | Hosaka et al. ............... 429/210 |
| 2004/0067417 A1 * | 4/2004 | Oosawa et al. ............... 429/210 |
| 2005/0019666 A1 * | 1/2005 | Yasuda ......................... 429/309 |
| 2005/0287425 A1 * | 12/2005 | Shi et al. ....................... 429/145 |
| 2006/0127763 A1 | 6/2006 | Watanabe et al. |

FOREIGN PATENT DOCUMENTS

| | | |
|---|---|---|
| JP | 2005-310667 A | 11/2005 |
| JP | 2005-340089 A | 12/2005 |
| JP | 2006-173095 A | 6/2006 |
| JP | 2006-261041 A | 9/2006 |
| WO | WO 03/085751 A2 | 10/2003 |

* cited by examiner

FIG. 18

| | POSITIVE ELECTRODE ACTIVE MATERIAL LAYER | | | NEGATIVE ELECTRODE ACTIVE MATERIAL LAYER | | | SEPARATOR | | | | | THICKNESS RATIO | | SINGLE CELL LAYER | CURRENT COLLECTOR | |
|---|---|---|---|---|---|---|---|---|---|---|---|---|---|---|---|---|
| | THICKNESS (μm) | MATERIAL | AVERAGE PARTICLE DIAMETER (μm) | THICKNESS (μm) | NEGATIVE ELECTRODE ACTIVE MATERIAL MATERIAL | AVERAGE PARTICLE DIAMETER (μm) | THICKNESS (μm) | SKELETON MATERIAL OF GEL ELECTROLYTE | AIR PERMEABILITY sec/10cc | TORTUOSITY | HARDNESS SHORE A | WITH RESPECT TO POSITIVE ELECTRODE ACTIVE MATERIAL LAYER | WITH RESPECT TO NEGATIVE ELECTRODE ACTIVE MATERIAL LAYER | THICKNESS (μm) | THICKNESS (μm) | MATERIAL |
| EXAMPLE 1 | 20 | LiMnO₂ | 5 | 20 | HARD CARBON | 6 | 15 | POLYESTER | 50 | 1.5 | 40 | 0.75 | 0.75 | 55 | 15 | SUS |
| EXAMPLE 2 | 28 | LiMnO₂ | 5 | 30 | HARD CARBON | 6 | 27 | POLYESTER | 80 | 1.5 | 25 | 0.96 | 0.90 | 85 | 15 | SUS |
| EXAMPLE 3 | 35 | LiMnO₂ | 8 | 37 | GRAPHITE | 9 | 33 | POLYOLEFIN | 150 | 1.6 | 80 | 0.94 | 0.89 | 105 | 15 | Cu/Al |
| EXAMPLE 4 | 12 | LiMnO₂ | 2 | 12 | HARD CARBON | 2 | 11 | ARAMID | 70 | 1.8 | 85 | 0.92 | 0.92 | 35 | 15 | SUS |
| EXAMPLE 5 | 6 | LiNiO₂ | 0.8 | 6 | HARD CARBON | 0.8 | 5 | ARAMID | 50 | 1.1 | 100 | 0.83 | 0.83 | 17 | 10 | SUS |
| EXAMPLE 6 | 20 | LiNiO₂ | 0.8 | 20 | HARD CARBON | 0.8 | 14 | ARAMID | 63 | 1.8 | 90 | 0.70 | 0.70 | 54 | 10 | SUS |
| COMPARATIVE EXAMPLE 1 | 40 | LiMnO₂ | 8 | 45 | HARD CARBON | 9 | 50 | POLYESTER | 50 | 1.5 | 40 | 1.25 | 1.11 | 135 | 15 | SUS |
| COMPARATIVE EXAMPLE 2 | 50 | LiMnO₂ | 8 | 55 | HARD CARBON | 9 | 50 | POLYESTER | 50 | 1.5 | 40 | 1.00 | 0.91 | 155 | 15 | SUS |

FIG. 19

| | INTERNAL RESISTANCE ($\Omega cm^2$) | FIRST RESONANCE PEAK (Hz) | VIBRATION DECREMENT (%) | HEAT RISING ($\delta T$) | HEAT RADIATION TIME (min) |
|---|---|---|---|---|---|
| EXAMPLE 1 | 30 | 115 | 32 | 16 | 9 |
| EXAMPLE 2 | 40 | 110 | 33 | 17 | 10 |
| EXAMPLE 3 | 35 | 125 | 35 | 20 | 15 |
| EXAMPLE 4 | 25 | 130 | 37 | 10 | 5 |
| EXAMPLE 5 | 23 | 145 | 38 | 8 | 4 |
| EXAMPLE 6 | 28 | 128 | 39 | 14 | 7 |
| COMPARATIVE EXAMPLE 1 | 60 | 80 | - | 30 | 60 OR MORE |
| COMPARATIVE EXAMPLE 2 | 70 | 85 | 5 | 25 | 60 OR MORE |

FIG. 20

| | FIRST RESONANCE PEAK (Hz) | VIBRATION DECREMENT (%) | HEAT RISING | | HEAT RADIATION TIME (min) |
|---|---|---|---|---|---|
| | | | ($\delta T$) | MEASUREMENT REGION | |
| EXAMPLE 7 | 125 | 9 | 19 | SECOND LAYER | 13 |
| EXAMPLE 8 | 120 | 4 | 19 | SECOND LAYER | 12 |
| EXAMPLE 9 | 140 | 14 | 21 | SECOND LAYER | 17 |
| EXAMPLE 10 | 145 | 19 | 13 | SECOND LAYER | 8 |
| EXAMPLE 11 | 160 | 19 | 9 | SECOND LAYER | 6 |
| EXAMPLE 12 | 135 | 30 | 19 | SECOND LAYER | 9 |
| EXAMPLE 13 | 135 | 30 | 7 | SECOND LAYER | 4 |
| COMPARATIVE EXAMPLE 3 | 90 | -5 | 40 | SECOND LAYER | 60 OR MORE |

FIG. 21

| | FIRST RESONANCE PEAK (Hz) | VIBRATION DECREMENT (%) | HEAT RISING | | HEAT RADIATION TIME (min) |
|---|---|---|---|---|---|
| | | | ($\delta T$) | MEASUREMENT REGION | |
| EXAMPLE 14 | 155 | 18 | 16 | FIFTH LAYER | 11 |
| COMPARATIVE EXAMPLE 4 | 95 | 0 | 60 | FIFTH LAYER | 60 OR MORE |

FIG. 22

| | FIRST RESONANCE PEAK (Hz) | VIBRATION DECREMENT (%) | HEAT RISING | | HEAT RADIATION TIME (min) |
|---|---|---|---|---|---|
| | | | ($\delta T$) | MEASUREMENT REGION | |
| EXAMPLE 15 | 160 | 38 | 21 | 50TH LAYER | 14 |
| COMPARATIVE EXAMPLE 5 | 100 | 5 | 80 | 50TH LAYER | 60 OR MORE |

BATTERY STRUCTURE, ASSEMBLED BATTERY, AND VEHICLE MOUNTING THESE THEREON

FIELD OF ART

The present invention relates to a battery structure, and more specifically, relates to a battery structure excellent in heat radiation characteristics or vibration isolation characteristics.

BACKGROUND ART

Among a variety of secondary batteries currently present, a bipolar-type lithium ion secondary battery (hereinafter, also described as a bipolar battery) excellent in energy density and output density have attracted attention. As disclosed in Japanese Extent Laid-Open Publication No. 2000-100471, a bipolar battery has a structure composed in such a manner that bipolar electrodes, each of which is composed by stacking a positive electrode active material layer, a current collector and a negative electrode active material layer in this order, and separators are stacked alternately.

The respective constituents of the bipolar battery for use in a mobile body such as a vehicle have been designed so that a thickness of each separator can be extremely thin as compared with a thickness of each positive electrode active material layer and a thickness of each negative electrode active material layer. This has been because a capacity and output of the bipolar battery are attempted to be increased by maximizing ratios occupied by the positive electrode active material layers and the negative electrode active material layers in a limited thickness of the bipolar battery itself.

However, since heat generation amounts of the positive electrode active material layers and the negative electrode active material layers are large, there has been a problem that heat becomes prone to accumulate in an inside of the battery by the fact that the ratios of these electrode active material layers are increased, thus making it prone to cause deteriorations of the electrolyte and the like, which are contained in the battery. This has been one of causes to decrease the output and service life of the battery.

Moreover, there is a problem that the conventional bipolar battery is prone to be affected by vibrations in terms of a structure thereof, resulting in that the respective layers composing the bipolar battery became prone to be dissociated from one another by the vibrations. This has also been one of the causes to decrease the output and service life of the battery.

DISCLOSURE OF INVENTION

The inventors of the present invention have focused attention an "thickness ratios" of the respective constituents of the bipolar battery, and have found out that the thickness ratios of the respective constituents, which have been heretofore regarded as preferable, have conversely brought the decrease of the battery output by making it prone to accumulate the heat in the inside of the battery and to give such an influence of the vibrations thereto. In such a way, the inventors of the present invention have completed the invention of this application.

Specifically, the present invention solves the above-described problems by a bipolar battery, including: a bipolar electrode composed by forming a positive electrode active material layer an one surface of a current collector and forming a negative electrode active material layer an the other surface; and a separator composed to be stacked alternately with the bipolar electrode, wherein, in a single cell layer composed by including the positive electrode active material layer, the separator and the negative electrode active material layer, which are adjacent to one another, a thickness of the separator is 0.68 times or more to less than 1.0 times a thickness of the positive electrode active material layer, and is 0.68 times or more to less than 1.0 times a thickness of the negative electrode active material layer.

BRIEF DESCRIPTION OF THE DRAWINGS

FIG. 18 shows results of measuring average reduction amounts of bipolar batteries fabricated in Examples 1 to 6 and Comparative examples 1 and 2.
FIG. 19 shows results of measuring resonance shift amounts of the bipolar batteries fabricated in Examples 1 to 6 and Comparative examples 1 and 2.
FIG. 20 shows results of measuring average reduction amounts, resonance shift amounts, heat risings and heat radiation times of bipolar batteries fabricated in Examples 7 to 13 and Comparative example 3.
FIG. 21 shows results of measuring average reduction amounts, resonance shift amounts, heat risings and heat radiation times of bipolar batteries fabricated in Example 14 and Comparative example 4.
FIG. 22 shows results of measuring average reduction amounts, resonance shift amounts, heat risings and heat radiation times of bipolar batteries fabricated in Example 15 and Comparative example 5.

BEST MODE FOR CARRYING OUT THE INVENTION

Figure 1:
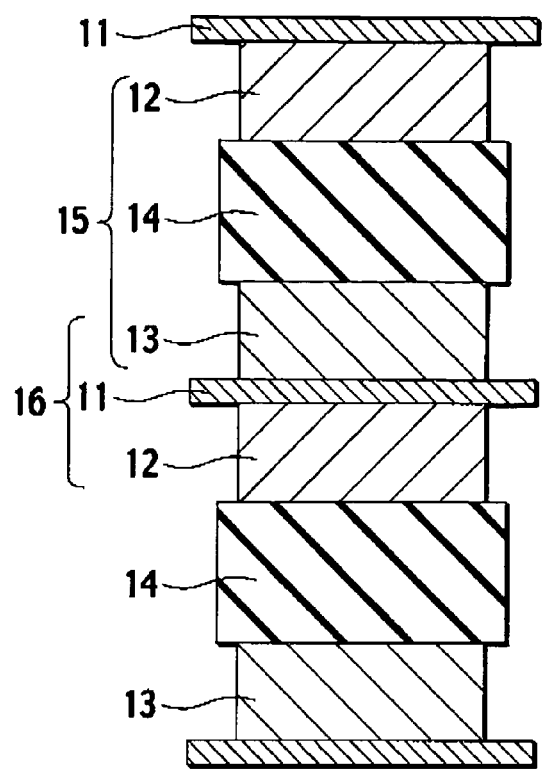
FIG. 1 is a partial schematic cross-sectional view of a bipolar battery.

As illustrated in FIG. 1, a first one of the present invention is a bipolar battery including: a bipolar electrode 16 composed by forming a positive electrode active material layer 12 on one surface of a current collector 11 and forming a negative electrode active material layer 13 on the other surface; and a separator 14 composed to be stacked alternately with the bipolar electrode 16, characterized in that, in a single cell layer 15 composed by including the positive electrode active material layer 12, the separator 14 and the negative electrode active material layer 13, which are adjacent to one another, a thickness of the separator 14 is 0.68 times or more to less than 1.0 times a thickness of the positive electrode active material layer 12, and is 0.68 times or more to less than 1.0 times a thickness of the negative electrode active material layer 13.

Figure 2:
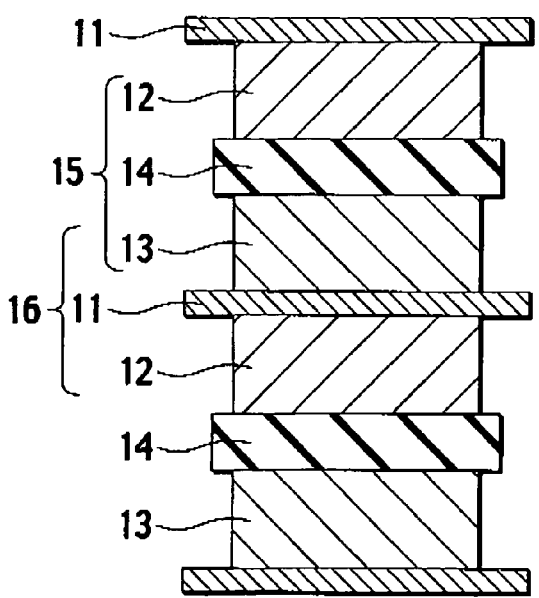
FIG. 2 is a partial schematic cross-sectional view of a conventional bipolar battery.

For comparison, a partial schematic cross-sectional view of a conventional bipolar battery is illustrated in FIG. 2. In visual comparison with FIG. 1 illustrating the invention of this application, it is understood that there is a large difference in a thickness ratio of the separator 14 with respect to those of the positive electrode active material layer 12 and the negative electrode active material layer 13. As described above, the conventional bipolar battery has increased the thickness ratios of the positive electrode active material layer 12 and the negative electrode active material layer 13 for the purpose of raising power generation efficiency thereof. As a result, heat radiation characteristics or vibration isolation characteristics of the conventional bipolar battery have been decreased, and the output thereof has been conversely decreased.

As opposed to this, the bipolar battery of the invention of this application has a structure, in which the thickness of the separator 14 is 0.68 times or more to less than 1.0 times the thickness of the positive electrode active material layer 12, and is 0.68 times or more to less than 1.0 times the thickness of the negative electrode active material layer, and accordingly, is extremely excellent in a balance between a capacity and the heat radiation characteristics or the vibration isolation characteristics. Therefore, the configuration of the invention of this application is applied, whereby a high-output bipolar battery can be obtained. Both of the ratios just need to be 0.68 times or more to less than 1.0 times; however, it is more preferable that both of the ratios be 0.75 to 0.95 times.

A description will be made below in detail of the separator, the positive electrode active material layer, the negative electrode active material layer, the current collector, and the single cell layer, which are constituents of the bipolar battery of the invention of this application, as well as other constituents.

[Separator]

In the case of a bipolar battery called a non-aqueous electrolytic solution secondary battery, in which an inside of the battery is filled with a liquid electrolyte (hereinafter, described as an electrolytic solution), the separator plays a role to prevent contact between the positive electrode active material layer and the negative electrode active material layer. Moreover, in the case of a bipolar battery called a polymer electrolyte secondary battery, in which an inside of the battery is not filled with the electrolytic solution, the separator plays a role of the electrolyte by itself in addition to the role to prevent the above-described contact. Hereinafter, the separator that does not play the role of the electrolyte by itself will be also described as a "narrow-sense separator", and the separator that plays the role of the electrolyte by itself will be also described as a "polymer electrolyte". The structure of the bipolar battery of the invention of this application is suitable for both of the non-aqueous electrolytic solution secondary battery and the polymer electrolyte secondary battery.

A description will be made below in detail of the narrow-sense separator that is the separator for use in the non-aqueous electrolytic solution secondary battery, and of the polymer electrolyte that is the separator for use in the polymer electrolyte secondary battery. Case of non-aqueous electrolytic solution secondary battery As the narrow-sense separator, polypropylene or polyolefin is preferable, and these are usable in a shape of nonwoven fabric or a microporous film. These are excellent in insulating properties, thermal stability, chemical stability, temperature cycle resistance, or mechanical strength, and in addition, can form a porous structure. It is preferable that the narrow-sense separator have the porous structure since a spring-damping effect of the separator is enhanced, and an impregnation ratio of the electrolytic solution is enhanced.

A thickness of the narrow-sense separator is preferably 35 μm or less, more preferably 25 μm or less, still more preferably 20 μm or less. It is preferable that the thickness be 35 μm or less since the output is enhanced. If the thickness is 25 μm or less, then the bipolar battery can be thinned more.

Air permeability of the narrow-sense separator is preferably 10 to 400 sec/10 cc, more preferably 40 to 200 sec/10 cc. If the air permeability is 10 sec/10 cc or more, then excellent vibration isolation characteristics are brought, and if the air permeability is 400 sec/10 cc or less, excellent battery output is brought.

A tortuosity ($\gamma$) of the narrow-sense separator is preferably 0.5 to 2.0, more preferably 0.9 to 1.8. The excellent vibration isolation characteristics are brought if the tortuosity is 0.5 or more, and the excellent battery output is brought if the tortuosity is 2.0 or less.

A hardness Snore A of the narrow-sense separator is preferably 20 to 110, more preferably 25 to 95. If the Shore A is 20 or more, then a resonant frequency becomes unlikely to shift to a low frequency side, and a possibility that a frequency of vibrations may reach the resonant frequency when the bipolar battery concerned receives the vibrations is decreased. Specifically, the narrow-sense separator becomes unlikely to resonate with the vibrations of an outside of the battery. If the Shore A is 110 or less, then the separator appropriately plays roles of a spring and a damper, and accordingly, the vibration isolation characteristics are enhanced. Moreover, if the hardness Shore A of the narrow-sense separator is within the above-described range, then, even in the case of using a separator with a small thickness, the bipolar electrodes arranged on both sides thereof can be spaced uniformly from each other, and further, a possibility that the bipolar electrodes may be short-circuited by contacting each other owing to the vibrations can be suppressed. A measurement method of the Shore A in the invention of this application conforms to JIS-K 6253.

In the case of stacking a plurality of the single cell layers, it is preferable that the hardness Shore A of the narrow-sense separator of at least one layer differ from the hardnesses Shore A of the narrow-sense separators of the other layers. In such a way, the vibration isolation characteristics can be enhanced.

For example, in the case of stacking five single cell layers, five layers of the narrow-sense separators are used, and in this case, two layers among them may be softened or hardened more than the other three narrow-sense separators. Moreover, all the five layers of narrow-sense separators may differ in hardness from one another. However, these are only for illustration, and do not limit the number of single cell layers to be stacked or a ratio of the narrow-sense separators of which hardnesses are to be changed. In the conventional general bipolar battery, in the case of stacking the plurality of single cell layers, ones having the same hardness have been used as the narrow-sense separators included in these single cell layers. However, as compared with the case where the narrow-sense separators having the same hardness are arranged in all the single cell layers, in the case where the hardness of the narrow-sense separator of at least one layer is made to differ from the hardnesses of the narrow-sense separators of the other layers, it becomes possible to change a mass/spring configuration of the battery, thus making it possible to enhance the vibration isolation characteristics.

In the case of stacking three or more of the single cell layers, it is preferable that the hardness Shore A of the narrow-sense separator included in the single cell layer disposed at a center of the bipolar battery be smallest of all the hardnesses Shore A of the narrow-sense separators included in the other single cell layers. In such a way, the vibration isolation characteristics and the heat radiation characteristics can be enhanced.

Figure 3:
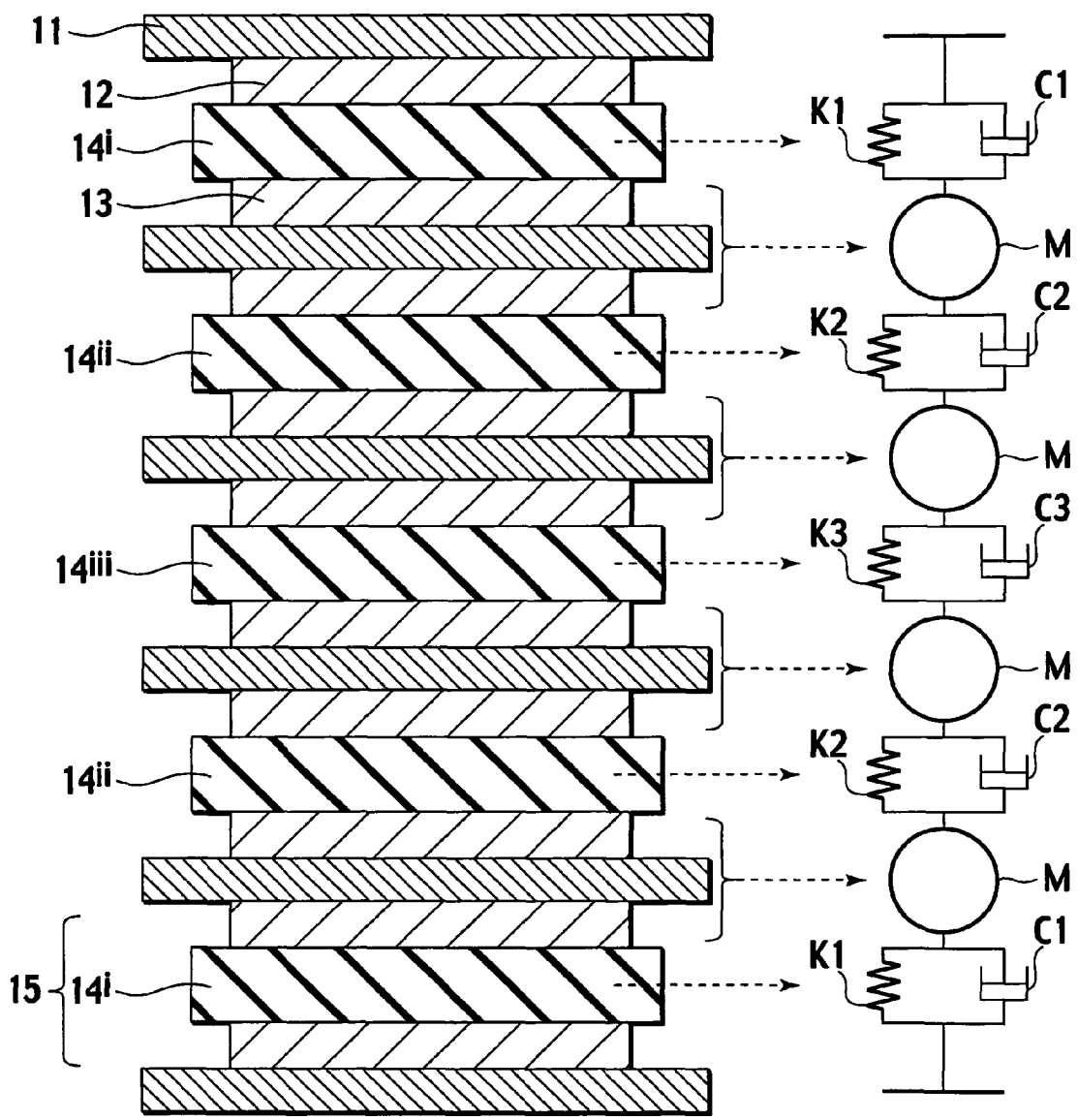
FIG. 3 is a view in which battery components are converted into mass/spring models.

A stacked body of the single cell layers and the current collectors can be converted into dynamical models composed of masses, springs and dampers. FIG. 3 illustrates a bipolar battery composed by stacking five single cell layers, and mass/spring models corresponding thereto. In FIG. 3, reference symbols K1 to K3 denote spring models, reference symbols C1 to C3 denote damper models, and reference symbols M denote the masses.

The hardness of the narrow-sense separator $14^{iii}$ included in the single cell layer 15 disposed at the center is made smaller than the hardnesses of the narrow-sense separators $14^{i\ and\ ii}$ included in the other single cell layers 15, whereby a spring constant of the spring model K3 can be made smaller than spring constants of the spring models K1 and K2, and a damper coefficient of the damper model C3 can be made larger than damper coefficients of the damper models C1 and C2. As a result, the resonant frequency when the bipolar battery receives the vibrations is shifted to a high frequency side, whereby a height of a peak thereof located in the vicinity of 180 Hz can be made smaller, and the vibration isolation characteristics can be enhanced.

Moreover, it is observed that, in many materials used as the narrow-sense separator, heat transfer coefficients thereof tend to become larger as the Shore A hardnesses thereof become smaller. As the heat transfer coefficients become larger, the heat radiation characteristics become higher. When FIG. 3 is taken as an example, it is the narrow-sense separator $14^{iii}$ that is the most prone to accumulate the heat among the respective narrow-sense separators. Accordingly, the hardness of the narrow-sense separator $14^{iii}$ is made smaller than those of the narrow-sense separators $14^{i\ and\ ii}$ included in the other single cell layers 15, whereby the heat radiation characteristics can be enhanced.

When FIG. 3 is taken as an example, the hardnesses of the narrow-sense separators may be changed step by step so as to become $14^{iii}<14^{ii}<14^{i}$, or only a part thereof may be made small so as to establish $14^{iii}<14^{ii}=14^{i}$ or $14^{iii}=14^{ii}<14^{i}$.

In the case of using the narrow-sense separator, the separator does not play the role of the electrolyte by itself, and accordingly, it is necessary to use the electrolytic solution in combination. As the electrolytic solution, one conventionally known in public, such as one in which support salt is dissolved in a non-aqueous solvent, can be used. For example, there is mentioned at least one type selected from the group consisting of cyclic carbonates such as propylene carbonate (hereinafter, also described as "PC") and ethylene carbonate (hereinafter, also described as "EC"); chain carbonates such as dimethyl carbonate, methyl ethyl carbonate and diethyl carbonate; ethers such as tetrahydrofuran, 2-methyltetrahydrofuran, 1,4-diaxane, 1,2-dimethoxyethane, 1,2-dibutoxyethane, 1,3-dioxolan, and diethyl ether; lactones such as γ-butyrolactane; nitriles such as acetonitrile; esters such as methyl propionate; amides such as dimethylformamide; esters such as methyl acetate and methyl formate; sulfolane; dimethyl sulfoxide; and 3-methyl-1,3-oxazolidine-2-on. As the support salt, there is preferably mentioned at least one type selected from the group consisting of $Li(C_2F_5SO_2)_2N$, $LiBF_4$, $LiPF_6$, $LiN(SO_2CF_3)_2$, and $LiN(SO_2C_2F_5)_2$. The electrolytic solution can contain other additives in response to the purpose.

Case of Polymer Electrolyte Secondary Battery

The polymer electrolyte as the separator that prevents the contact between the positive electrode active material layer and the negative electrode active material layer, and further, also plays the role of the electrolyte is classified into an intrinsic polymer electrolyte and a gel electrolyte, and both are suitable for the invention of this application.

The intrinsic polymer electrolyte is a solid state electrolyte made of a polymer. In the case of using the intrinsic polymer electrolyte, the electrolytic solution is not contained in the electrolyte, and accordingly, there is an advantage that safety is high since there is no fear of liquid leakage. As the polymer composing the intrinsic polymer electrolyte, ones conventionally known in public, such as polyethylene oxide, polypropylene oxide, polyester resin, aramid resin, polyolefin resin, copolymers of these, alloys of these, or the like, are preferable. More preferably, the polymer is the aramid resin. PET and the like are preferably mentioned as the polyester resin. Para-aromatic polyamide, meta-aromatic polyamide, and the like are preferably mentioned as the aramid resin. Polyethylene, polypropylene, and the like are preferably mentioned as the polyolefin resin. Moreover, in order to enhance ion conductivity, ones in which the support salt is added to these may be used as the electrolyte, or ones in which an ionic dissociation group such as a carboxylate group, a phosphate group, a sulfonate group, and a siloxyl amine group is introduced into these may be used as the electrolyte. Details of the support salt are as described in the above-described paragraphs of the non-aqueous secondary battery.

The above-described resins are excellent in waterproof properties, moisture barrier properties, temperature cycle resistance, thermal stability and insulating properties, and in addition, can form the porous structure. It is preferable that the intrinsic polymer electrolyte have the porous structure since the spring-damping effect of the separator is enhanced, and the impregnation ratio of the electrolytic solution is enhanced. In particular, the aramid resin can thin the separator.

A thickness of the intrinsic polymer electrolyte is preferably 35 μm or less, more preferably 25 μm or less, still more preferably 20 μm or less. It is preferable that the thickness be 35 μm or less since the output is enhanced. If the thickness is 25 μm or less, the bipolar battery can be thinned more.

Air permeability of the intrinsic polymer electrolyte is preferably 10 to 400 sec/10 cc, more preferably 40 to 200 sec/10 cc. The excellent vibration isolation characteristics are brought if the air permeability is 10 sec/10 cc or more, and the excellent battery output is brought if the air permeability is 400 sec/10 cc or less.

A tortuosity (γ) of the intrinsic polymer electrolyte is preferably 0.5 to 2.0, more preferably 0.9 to 1.8. The excellent vibration isolation characteristics are brought if the tortuosity is 0.5 or more, and the excellent battery output is brought if the tortuosity is 2.0 or less.

A hardness Shore A of the intrinsic polymer electrolyte is preferably 20 to 110, more preferably 25 to 95. Reasons and details of this are as described in the above-described paragraphs of the hardness Shore A of the narrow-sense separator of the non-aqueous secondary battery.

In the case of stacking the plurality of single cell layers, it is preferable that the hardness Shore A of the intrinsic polymer electrolyte of at least one layer differ from the hardnesses Shore A of the intrinsic polymer electrolytes of the other layers. Reasons and details of this are as described in the above-described paragraphs of the hardness Shore A of the narrow-sense separator of the non-aqueous secondary battery.

In the case of stacking three or more of the single cell layers, it is preferable that the hardness Shore A of the intrinsic polymer electrolyte contained in the single cell layer disposed at the center of the bipolar battery be smaller than the hardnesses Shore A of the intrinsic polymer electrolytes contained in the other single cell layers. Reasons and details of this are as described in the above-described paragraphs of the hardness Shore A of the narrow-sense separator of the non-aqueous secondary battery.

The gel electrolyte is a gelled electrolyte, in which the polymer constructs a three-dimensional network structure by interaction among molecular chains, such as chemical bonding, crystallization, and molecular entanglement, and the electrolytic solution is held in gaps of the network structure concerned. In the case of using the gel electrolyte, there is an advantage that it is easy to enhance the vibration isolation characteristics since it is easy to adjust the spring constants and the damper constants.

One in which the electrolytic solution is held in a skeleton that is the intrinsic polymer electrolyte in which the polymer has the ion conductivity by itself, or one in which the electrolytic solution is held in a skeleton that is a polymer having no ion conductivity by itself or low ion conductivity, can be used as the gel electrolyte. As the polymer having no ion conductivity or the low ion conductivity, ones conventionally known in public, such as polyvinylidene fluoride, polyvinyl chloride, polyacrylanitrile, polymethylmethacrylate, copolymers of these, alloys of these or the like can be used. Details of the electrolytic solution are as described in the above-described paragraphs of the non-aqueous secondary battery. In the gel electrolyte, a mass ratio of the polymer and the electrolytic solution is not particularly limited, and can be decided as appropriate in consideration for the battery output, the spring constants, and the like.

A thickness of the gel electrolyte is preferably 35 μm or less, more preferably 25 μm or less, still more preferably 20 μm or less. It is preferable that the thickness be 35 μm or less since the output is enhanced. If the thickness is 25 μm or less, then the bipolar battery can be thinned more.

Air permeability of the polymer that becomes the skeleton of the gel electrolyte is preferably 10 to 400 sec/10 cc, more preferably 40 to 200 sec/10 cc. The excellent vibration isolation characteristics are brought if the air permeability is 10 sec/10 cc or more, and the excellent battery output is brought if the air permeability is 400 sec/10 cc or less.

A tortuosity (γ) of the skeleton contained in the gel electrolyte is preferably 0.5 to 20, more preferably 0.9 to 1.8. The excellent vibration isolation characteristics are brought if the tortuosity is 0.5 or more, and the excellent battery output is brought if the tortuosity is 20 or less.

A hardness Shore A of the gel electrolyte is preferably 20 to 110, more preferably 25 to 95. Reasons and details of this are as described in the above-described paragraphs of the hardness Shore A of the narrow-sense separator of the non-aqueous secondary battery.

In the case of stacking the plurality of single cell layers, it is preferable that the hardness Shore A of the gel electrolyte of at least one layer differ from the hardnesses Shore A of the intrinsic polymer electrolytes of the other layers. Reasons and details of this are as described in the above-described paragraphs of the hardness Shore A of the narrow-sense separator of the non-aqueous secondary battery.

In the case of stacking three or more of the single cell layers, it is preferable that the hardness Shore A of the gel electrolyte contained in the single cell layer disposed at the center of the bipolar battery be smaller than the hardnesses Shore A of the gel electrolytes contained in the other single cell layers. Reasons and details of this are as described in the above-described paragraphs of the hardness Shore A of the narrow-sense separator of the non-aqueous secondary battery.

As described above, in the case where the plurality of single cell layers are stacked, and the Shore A of the narrow-sense separators included therein are made to differ from one another, the plural types of intrinsic polymer electrolytes may be used, the plural types of gel electrolytes may be used, or the intrinsic polymer electrolyte and the gel electrolyte may be used in combination.

[Positive Electrode Active Material Layer]

The positive electrode active material layer contains a positive electrode active material. As the positive electrode active material, there can be used a composite oxide of lithium and transition metal, a transit ion metal oxide, a transition metal sulfide, $PbO_2$, AgO, NiOOH, or the like. As such a compound of the transition metal and the lithium, there is preferably mentioned: a Li—Mn composite oxide such as spinel $LiMn_2O_4$; a Li—Co composite oxide such as $LiCoO_2$; a Li—Ni composite oxide such as $LiNiO_2$; a Li—Fe composite oxide such as $LiFeO_2$; a phosphate compound of the transition metal and the lithium, such as $LiFePO_4$; a sulfate compound of the transition metal and the lithium; or the like. As specific examples of the transition metal oxide, $V_2O_5$, $MnO_2$, $MoO_3$ and the like are mentioned. As examples of the transition metal sulfide, $TiS_2$, $MoS_2$ and the like are preferably mentioned.

It is particularly preferable to use the Li—Mn composite oxide among the above-described specific examples. If the Li—Mn composite oxide is used, then, in a charge/discharge curve obtained from a graph of voltage-charge/discharge time, a horizontal portion thereof with respect to an axis of the charge/discharge time can be inclined. Accordingly, a voltage is measured, whereby a state of charge (SOC) of the bipolar battery can be assumed. As a result, overcharge and overdischarge of the bipolar battery can be sensed and dealt with, and reliability at the time when the bipolar battery is abnormal can be increased.

An average particle diameter of the positive electrode active material is preferably 10 μm or less, more preferably 5 μm or less, still more preferably 2 μm or less. It is preferable that the average particle diameter be 10 μm or less since electrode resistance of the positive electrode active material layer is reduced. It is preferable that the average particle diameter be 2 μm or less since a surface of the positive electrode active material layer can be uniformed even though the thickness of the positive electrode active material layer is thinned. Moreover, it is preferable that the average particle diameter of the positive electrode active material be 1/10 or less of the thickness of the separator. If the average particle diameter of the positive electrode active material is 1/10 or less of the thickness of the separator, then a risk that the positive electrode active material may break through the separator to cause a micro short circuit is reduced.

The positive electrode active material layer can also contain the electrolyte, the support salt, a conductive additive, or the like in response to the purpose. Details of the electrolyte are as described in the above-described paragraphs of the separator. If the electrolyte is used, then the ion conductivity can be enhanced. The support salt is as described in the above-described paragraphs of the non-aqueous electrolytic solution secondary battery. If the support salt is used, then the ion conductivity can be enhanced. As the conductive additive, acetylene black, carbon black, graphite or the like is preferably mentioned. If the conductive additive is used, then electron conductivity can be enhanced. Loadings of the positive electrode active material, the electrolyte, the support salt, the conductive additive and the like in the positive electrode active material layer can be adjusted as appropriate in consideration for the usage purpose and the like of the battery.

The thickness of the positive electrode active material layer is preferably 35 μm or less, more preferably 11 μm or less, still more preferably 11 to 7 μm. It is preferable that the thickness be 35 μm or less since the output of the bipolar battery can be enhanced. If the thickness is 11 μm or less, the bipolar battery can be thinned more. It is preferable that the thickness be 7 μm or more since the vibration isolation characteristics of the positive electrode active material can be ensured to be high.

[Negative Electrode Active Material Layer]

The negative electrode active material layer contains a negative electrode active material. As the negative electrode active material, there are preferably mentioned at least one type selected from the group consisting of: a crystalline carbon material; a non-crystalline carbon material; a metal oxide such as TiO, $Ti_2O_3$ and $TiO_2$; and a composite oxide of the lithium and the transition metal, such as $Li_{4/3}Ti_{5/3}O_4$, and the like.

It is particularly preferable to use the crystalline carbon material or the non-crystalline carbon material among the above-described specific examples, more preferably the nm-crystalline carbon material. If the crystalline carbon material or the non-crystalline carbon material is used, then, in the charge/discharge curve obtained from the graph of the voltage-charge/discharge time, the horizontal portion thereof with respect to the axis of the charge/discharge time can be inclined. Accordingly, the voltage is measured, whereby the state of charge (SOC) of the bipolar battery can be assumed. As a result, the overcharge and the overdischarge of the bipolar battery can be sensed and dealt with, and the reliability thereof at the time when the bipolar battery is abnormal can be increased.

An average particle diameter of the negative electrode active material is preferably 10 μm or less, more preferably 5 μm or less, still more preferably 2 μm or less. It is preferable that the average particle diameter be 10 μm or less since electrode resistance of the negative electrode active material layer is reduced. It is preferable that the average particle diameter be 2 μm or less since a surface of the negative electrode active material layer can be uniformed even though the thickness of the negative electrode active material layer is thinned. Moreover, it is preferable that the average particle diameter of the negative electrode active material be 1/10 or less of the thickness of the separator. If the average particle diameter of the negative electrode active material is 1/10 or less of the thickness of the separator, then a risk that the negative electrode active material may break through the separator to cause the micro short circuit is reduced.

The negative electrode active material layer can also contain the electrolyte, the support salt, the conductive additive, or the like in response to the purpose. Specific examples of these are as described in the above-described paragraphs of the positive electrode active material layer. Loadings of the negative electrode active material, the electrolyte, the support salt, the conductive additive and the like in the negative electrode active material layer can be adjusted as appropriate in consideration for the usage purpose and the like of the battery.

The thickness of the negative electrode active material layer is preferably 35 μm or less, more preferably 13 μm or less, still more preferably 13 to 10 μm. It is preferable that the thickness be 35 μm or less since the output of the bipolar battery can be enhanced. It is preferable that the thickness be 13 μm or less since the bipolar battery can be thinned more. It is preferable that the thickness be 10 μm or more since the vibration isolation characteristics of the negative electrode active material can be ensured to be high.

[Current Collector]

A material of the current collector is not particularly limited, and one conventionally known in public can be used. For example, at least one type selected from the group consisting of aluminum, an aluminum alloy, titanium, copper, nickel, silver and stainless steel, and the like can be preferably used. These may be used in single layer, or may be used in plural layers, or cladding materials coated with these may be used. The above-described materials are excellent in corrosion resistance, conductivity, processability, or the like.

It is preferable that a thickness of the current collector be 15 μm or less. If the thickness is 15 μm or less, the bipolar battery can be thinned. However, in the case of using, as tabs, the current collectors (hereinafter, also described as end-portion current collectors) themselves arranged on both ends of the stacked body without coupling the tabs to the current collectors, it is preferable that a thickness of the end-portion current collectors be 0.1 to 2 nm.

[Single Cell Layer]

Figure 4:
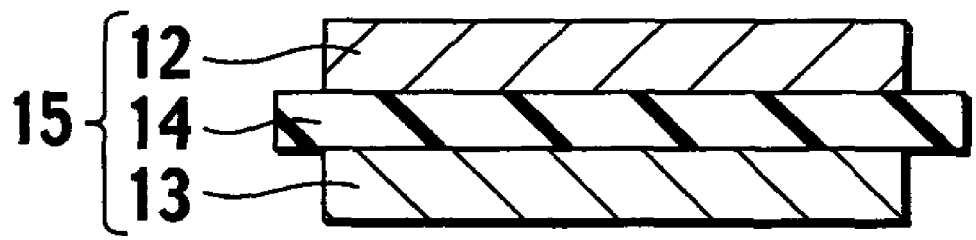
FIG. 4 is a partial schematic cross-sectional view of a single cell layer.
Figure 5:
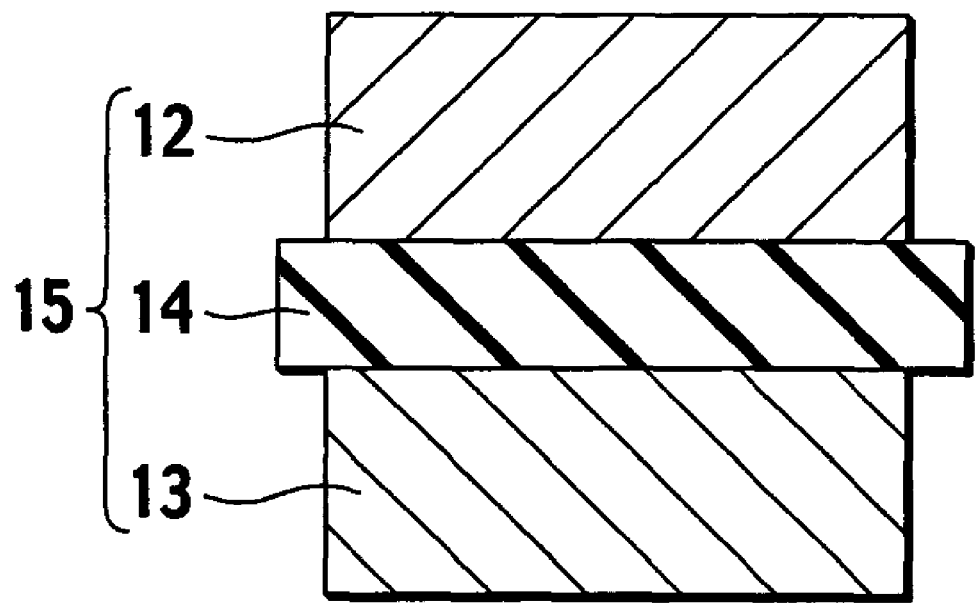
FIG. 5 is a partial schematic cross-sectional view of a single cell layer of the conventional bipolar battery.

The single cell layer of the bipolar battery is composed by including the positive electrode active material layer, the separator, and the negative electrode active material layer, which are adjacent to one another. In the invention of this application, a thickness of the single cell layer is preferably 10 to 85 μm, more preferably 20 to 50 μm. If the thickness of the single cell layer is 85 μm or less, then the bipolar battery is extremely excellent in heat radiation characteristics and vibration isolation characteristics. A single cell component included in the conventional bipolar battery has had a thickness of approximately 135 μm even in the thinnest portion thereof. For comparison, FIG. 4 illustrates the single cell layer with the above-described structure, and FIG. 5 illustrates the single cell layer of the conventional bipolar battery. It is understood that the single cell layer of the invention of this application is extremely thin.

The thickness of the single cell layer is made thinner than the conventional one, whereby the resonant frequency when the bipolar battery receives the vibrations can be shifted to the high frequency side, and the height of the peak thereof located in the vicinity of 180 Hz can be made smaller, thus making it possible to enhance the vibration isolation characteristics. Moreover, the thickness of the single cell layer is made thinner than the conventional one, whereby diffusion resistance and ion migration resistance in the positive electrode active material layer and the negative electrode active material layer can be suppressed from being increased, thus making it possible to reduce heat generation amounts thereof.

It is preferable that a thickness of at least one type selected from the group consisting of the positive electrode active material layer, the separator, and the negative electrode active material layer, which compose the single cell layer, be 35 μm or less. It is more preferable that a total thickness of all of these constituents be 35 μm or less. It is still more preferable that the thickness of the positive electrode active material layer be 7 to 11 μm, that the thickness of the separator be 13 to 15 μm, and that the thickness of the negative electrode active material layer be 10 to 13 μm.

With regard to the respective ratios of the thicknesses of the positive electrode active material layer, the separator, and the negative electrode active material layer, which compose the single cell layer, it is preferable that the ratio of the separator and the positive electrode active material layer be equal to 1:1.13 to 1:2, it is preferable that the ratio of the separator and the negative electrode active material layer be equal to 1:1.17 to 1:2, and it is preferable that the ratio of the positive electrode active material layer and the negative electrode active material layer be equal to 1:1 to 1:1.14. In particular, when the thickness of the single cell layer is 20 μm, it is preferable that the ratio of the positive electrode active material layer, the separator and the negative electrode active material layer be equal to 7:6:7 or 7:5:8, and when the thickness of the single cell layer is 50 μm, it is preferable that the ratio of the positive electrode active material layer, the separator and the negative electrode active material layer be equal to 17:15:18 or 20:10:20.

[Other Constituents]

Figure 6:
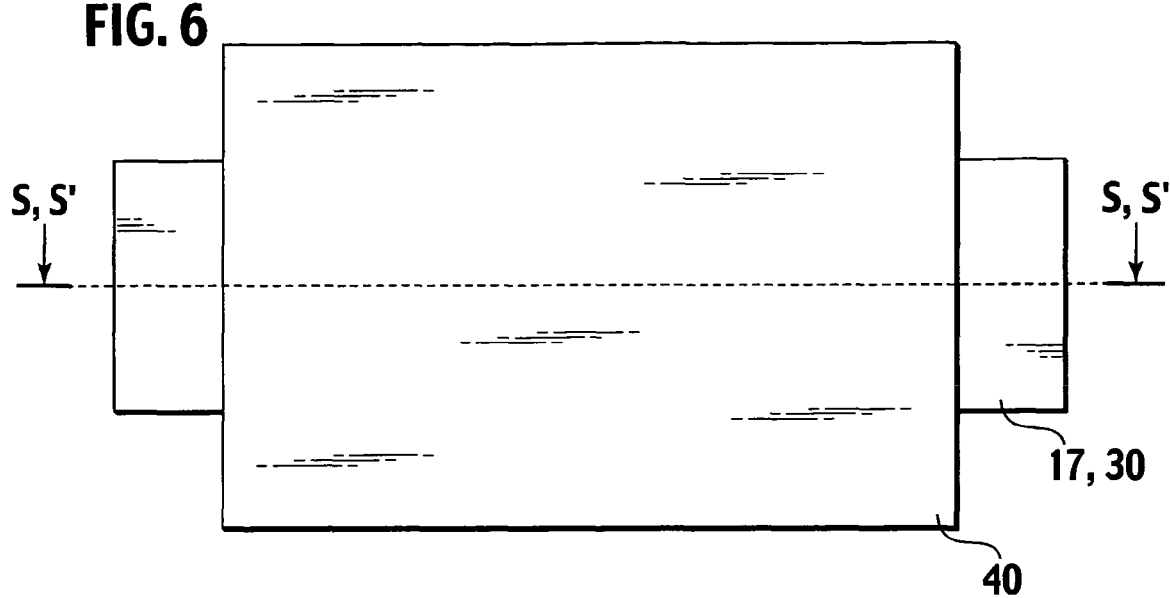
FIG. 6 is a schematic plan view of the bipolar battery.
Figure 7:
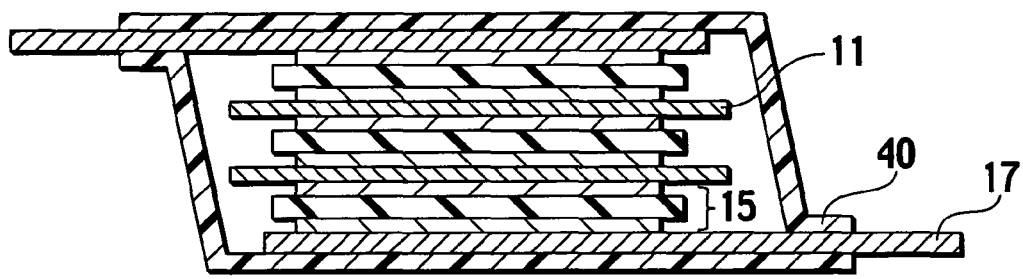
FIG. 7 is a schematic cross-sectional view of the bipolar battery shown in FIG. 6
Figure 8:
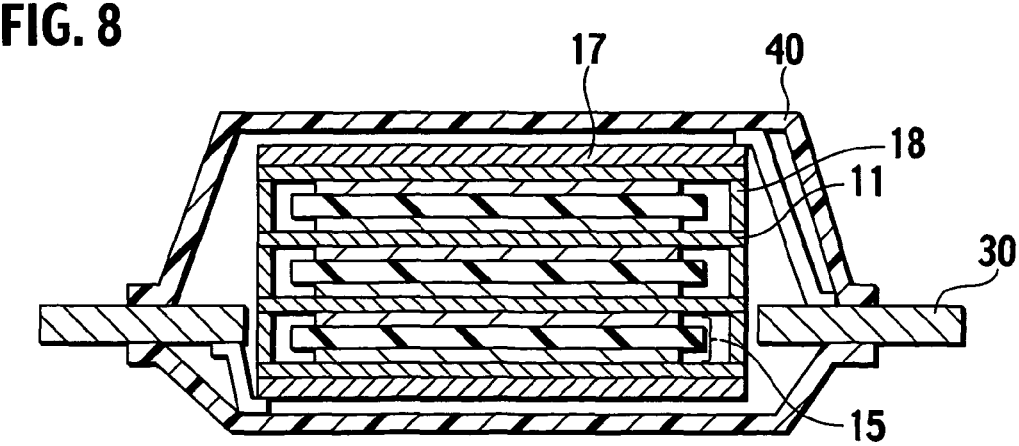
FIG. 8 is a schematic cross-sectional view of the bipolar battery shown in FIG. 6.

A schematic plan view and schematic cross-sectional views (along lines S-S and S'-S') of the bipolar batteries, each of which includes the stacked body composed of the above-described current collectors, positive electrode active material layers, separators and negative electrode active material layers, are shown in FIG. 6 to FIG. 8.

A shape of the bipolar battery is not particularly limited as long as it is within a range of not inhibiting the present invention, and a shape conventionally known in public can be applied thereto. For example, as shown by the line S-S, a shape in which end-portion current collectors 17 are used as the tabs may be adopted, or as shown by the line S'-S', a shape in which tabs 30 are coupled to the end-portion current collectors 17 may be adopted. Moreover, in the case of using the gel electrolyte, as denoted by reference numeral 18 an the line S'-S', a sealing portion is provided, thus also making it possible to suppress the electrolytic solution that has seeped from the gel electrolyte from leaking out. A material of the tabs, the sealing portion or the like is not particularly limited, and one conventionally known in public can be used as appropriate. A package 40 for housing the stacked body therein is not particularly limited, and a material conventionally known in public, such as a laminate material, can be used.

Moreover, the number of single cell layers to be stacked is not limited, and can be decided as appropriate in response to the purpose.

A second one of the present invention is an assembled battery composed by connecting the above-described bipolar batteries in series or in parallel.

Figure 9:
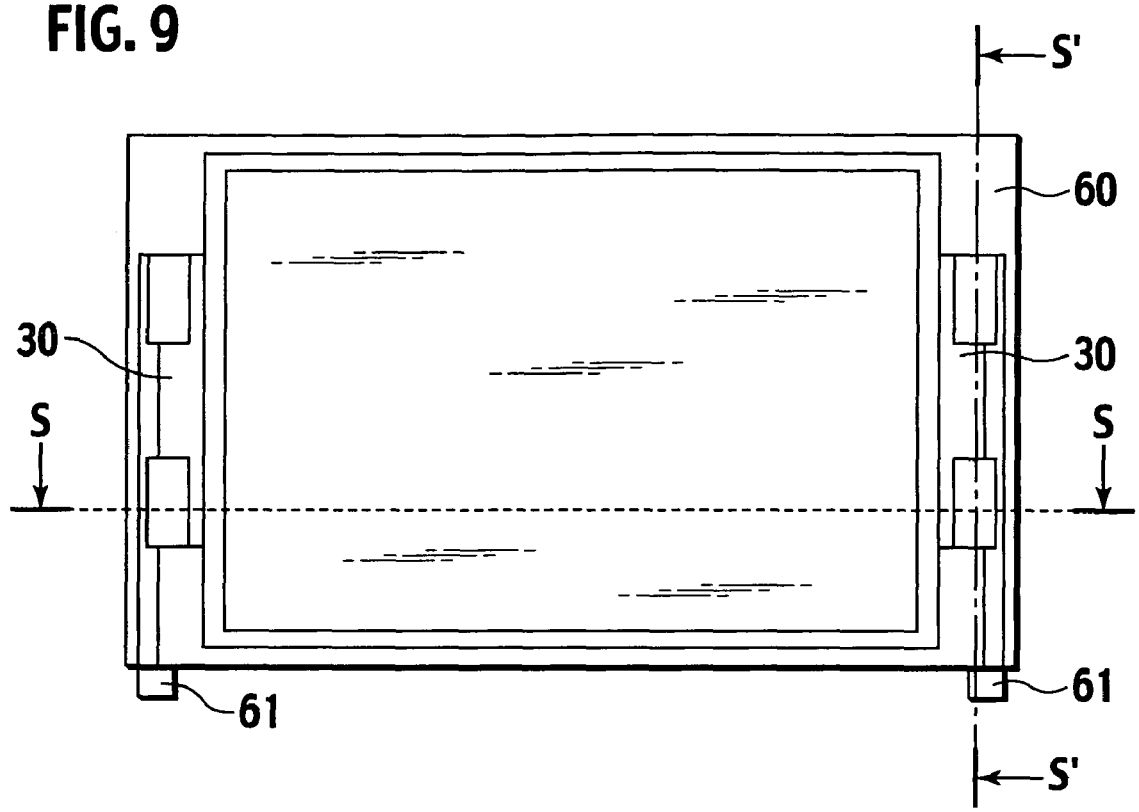
FIG. 9 shows a schematic plan view of an assembled battery module in which the bipolar batteries shown in FIG. 6 are housed in a battery case.
Figure 10:
FIG. 10 is a schematic cross-sectional view of the assembled battery module shown in FIG. 9.
Figure 11:
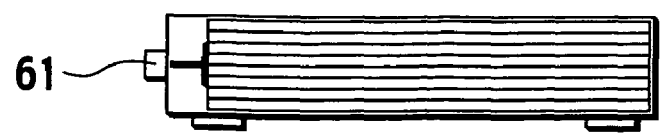
FIG. 11 is a schematic cross-sectional view of the assembled battery module shown in FIG. 9.
Figure 12:
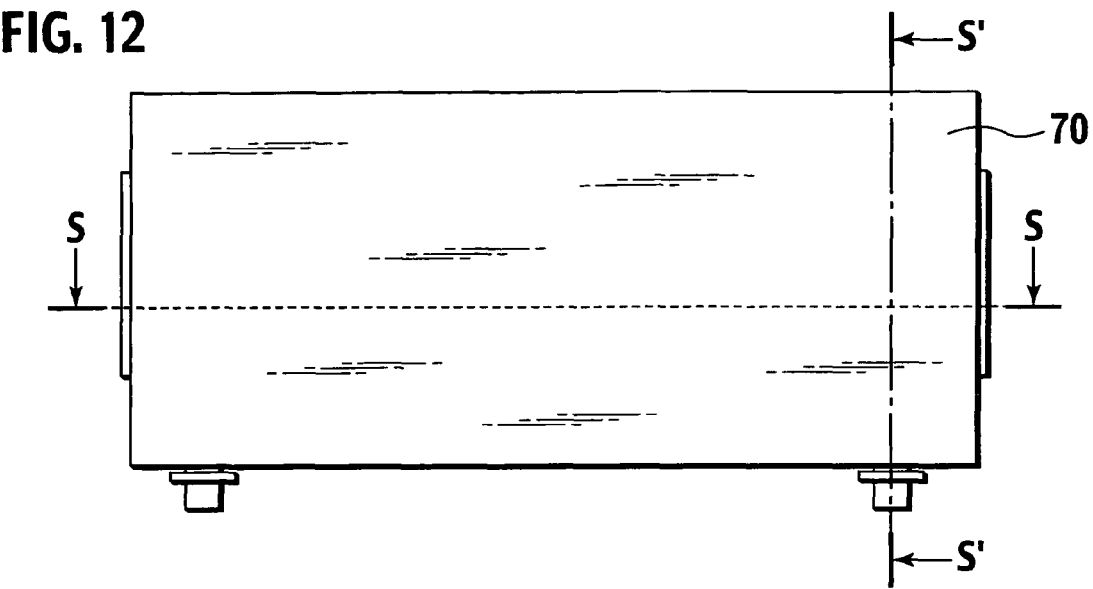
FIG. 12 is a schematic plan view of an assembled battery in which six pieces of the assembled battery modules shown in FIG. 9 are connected in parallel.
Figure 13:
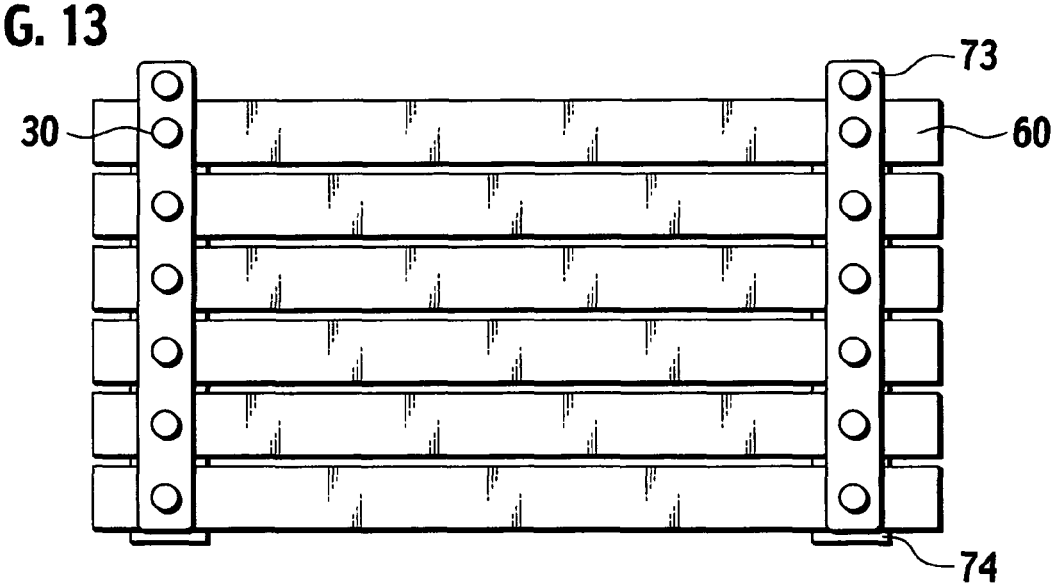
FIG. 13 is a schematic cross-sectional view of the assembled battery shown in FIG. 12.
Figure 14:
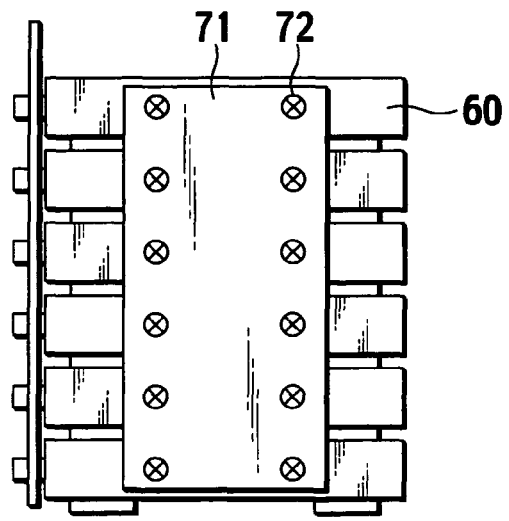
FIG. 14 is a schematic cross-sectional view of the assembled battery shown in FIG. 12.

Schematic appearance views of an assembled battery module 60 in which the bipolar batteries shown in FIG. 6 are housed in a battery case are shown in FIG. 9 to FIG. 11, and schematic appearance views of an assembled battery 70 in which six pieces of the assembled battery modules 60 are connected in parallel are shown in FIG. 12 to FIG. 14.

In FIG. 9 to FIG. 11, the tabs 30 are coupled to a positive electrode terminal 61 or a negative electrode terminal 61.

In FIG. 9 to FIG. 11, the respective assembled battery modules 60 are integrated together by a coupling plate 71 and fixing screws 72, and elastic bodies are placed among the respective assembled battery modules 60, whereby a vibration isolation structure is formed. Moreover, the tabs 30 of the respective assembled battery modules 60 are coupled to one another by busbars 73. FIGS. 9 to 11 and FIG. 12 to FIG. 14 illustrate examples of the assembled battery modules and the assembled battery, and the present invention is not limited to these.

A third one of the present invention is a vehicle composed by mounting thereon the above-described bipolar battery or the above-described assembled battery.

Figure 15:
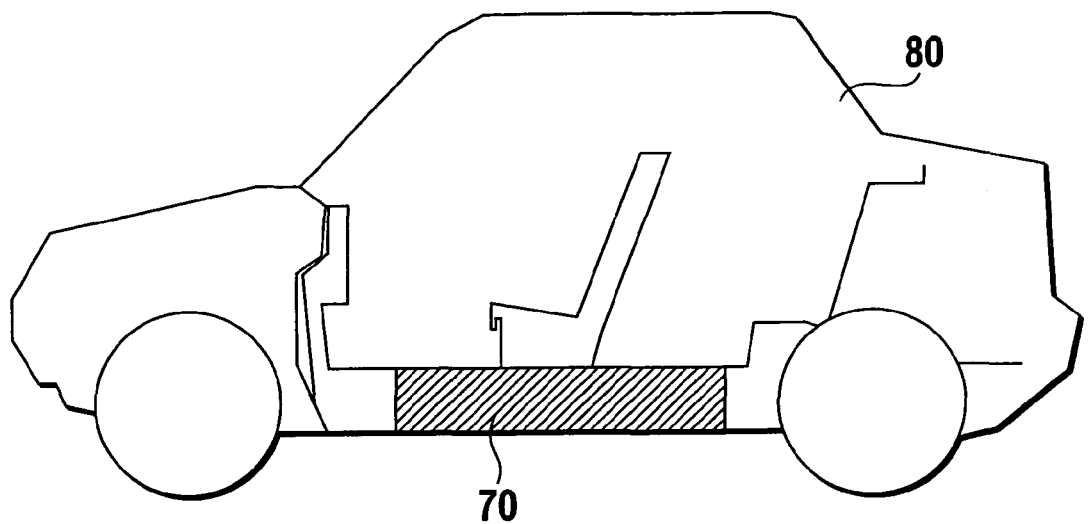
FIG. 15 is a schematic cross-sectional view of a vehicle.

The bipolar battery of the present invention or the assembled battery including the bipolar battery of the present invention has the enhanced heat radiation characteristics or vibration isolation characteristics, and is excellent in output, and accordingly, can be preferably used as a mobile power supply of the vehicle and the like. As shown in FIG. 15, the bipolar battery or assembled battery 70 of the present invention may be placed under a floor of a vehicle 80, or can be placed behind a seat back, under a seat, or the like.

Moreover, the present invention can also be applied to stacked-structured lithium-ion secondary batteries other than that of the bipolar type.

EXAMPLES

Next, by taking examples, a description will be specifically made of the invention of this application; however, these examples do not limit the invention of this application at all.

Example 1

Two pieces of SUS foil with a thickness of 15 Attn were prepared as the end-portion current collectors. $LiMnO_2$ (average particle diameter: 5 μm) was used as the positive electrode active material, and one formed into slurry, which was obtained by adding thereto N-methylpyrrolidane (NMP) as a slurry viscosity adjusting solvent, was applied on one surface of one piece of the SUS foil, followed by drying, whereby an positive electrode active material layer with a thickness of 20 μm was formed.

In a similar way, hard carbon (average particle diameter: 6 μm; non-crystalline carbon material) was prepared as the negative electrode active material, and one formed into slurry, which was obtained by adding the NMP thereto, was applied on one surface of one piece of the SUS foil, followed by drying, whereby a negative electrode active material layer with a thickness of 20 μm was formed.

Polyester nonwoven fabric (thickness: 15 μm; Shore A: 40) was impregnated with an oligomer of PVdF, whereby the narrow-sense separator was fabricated. Next, the narrow-sense separator was immersed into a pregel solution composed of: 5 wt % of a monomer solution (copolymer of polyethylene oxide and polypropylene oxide) with an average molecular weight of 7500 to 9000, which is a precursor of an ion conductive polymer matrix; 95 wt % of PC+EC (PC:EC=1:1 (volume ratio)) as the electrolytic solution; 1.0 M of LiBETI; and a polymerization initiator (BDK: 0.01 to 1 mass % with respect to the precursor of the ion conductive polymer matrix that is a host polymer (polymer material of a polymer gel electrolyte). Then, the separator thus immersed into the pregel solution was sandwiched between quartz glass substrates, an ultraviolet ray was irradiated thereonto for 15 minutes, and the precursor was crosslinked, whereby a gel electrolyte composed of the separator containing the gel electrolyte was obtained.

These were combined so as to be placed in order of the current collector, the positive electrode active material layer, the separator, the negative electrode active material layer, and the current collector. Then, a tab (thickness: 100 μm; width: 100 mm) of Al was vibration-welded to the end-portion current collector that contacts the positive electrode, and a tab (thickness: 100 μm; width: 100 mm) of Cu was vibration-welded to the end-portion current collector that contacts the negative electrode. An obtained stacked body attached with the tabs was sealed by a three-layer structured laminate material composed of a maleic acid-modified polypropylene film, SUS foil, and Nylon.

Next, a sealed body thus obtained was heated and crosslinked at 80° C. for two hours, and a bipolar battery composed of one single cell layer was fabricated.

Example 2

A bipolar battery was fabricated in a similar way to Example 1 except that the thickness of the positive electrode active material layer was set at 28 μm, that the thickness of the negative electrode active material layer was set at 30 μm, and that the thickness of the separator was set at 27 μm.

Example 3

A bipolar battery was fabricated in a similar way to Example 1 except that the average particle diameter of the positive electrode active material was set at 8 μm, that graphite (crystalline carbon material) was used as the negative electrode active material, that the average particle diameter of the negative electrode active material was set at 9 μm, that polyolefin (Shore A: 80) was used as the skeleton of the gel electrolyte, that Cu—Al clad was used as the current collector, that the thickness of the positive electrode active material layer was set at 35 μm, that the thickness of the negative electrode active material layer was set at 37 μm, and that the thickness of the separator was set at 33 μm.

Example 4

A bipolar battery was fabricated in a similar way to Example 1 except that the average particle diameter of the positive electrode active material was set at 2 μm, that the average particle diameter of the negative electrode active material was set at 2 μm, that aramid (Shore A: 85) was used as the skeleton of the gel electrolyte, that the thickness of the positive electrode active material layer was set at 12 μm, that the thickness of the negative electrode active material layer was set at 12 μm, and that the thickness of the separator was set at 11 μm.

Example 5

A bipolar battery was fabricated in a similar way to Example 1 except that $LiNiO_2$ was used as the positive electrode active material, that the average particle diameter of the positive electrode active material was set at 0.8 μm, that the average particle diameter of the negative electrode active material was set at 0.8 μm, that aramid (Shore A: 100) was used as the skeleton of the gel electrolyte, that the thickness of the positive electrode active material layer was set at 6 μm, that the thickness of the negative electrode active material layer was set at 6 μm, that the thickness of the separator was set at 5 μm, and that the thickness of the current collector was set at 10 μm.

Example 6

A bipolar battery was fabricated in a similar way to Example 1 except that $LiNiO_2$ was used as the positive electrode active material, that the average particle diameter of the positive electrode active material was set at 0.8 μm, that the average particle diameter of the negative electrode active material was set at 0.8 μm, that aramid (Shore A: 90) was used as the skeleton of the gel electrolyte, that the thickness of the separator was set at 14 μm, and that the thickness of the current collector was set at 10 μm.

Comparative Example 1

A bipolar battery was fabricated in a similar way to Example 1 except that the average particle diameter of the positive electrode active material was set at 8 μm, that the average particle diameter of the negative electrode active material was set at 9 μm, that the thickness of the positive electrode active material layer was set at 40 μm, that the thickness of the negative electrode active material layer was set at 45 μm, and that the thickness of the separator was set at 50 μm.

Comparative Example 2

A bipolar battery was fabricated in a similar way to Example 1 except that the average particle diameter of the positive electrode active material was set at 8 μm, that the average particle diameter of the negative electrode active material was set at 9 μm, that the thickness of the positive electrode active material layer was set at 50 μm, that the thickness of the negative electrode active material layer was set at 55 μm, and that the thickness of the separator was set at 50 μm.

By using the bipolar batteries fabricated in Examples 1 to 6 and Comparative examples 1 and 2, there were measured average reduction amounts therein, resonance shift amounts therein, heat risings therein, and heat radiation times therein. Details of methods of such measurements will be described below, and results of the respective measurements are shown in FIG. 18 and FIG. 19.

(Measurement of Average Reduction Amount)

An acceleration pickup was provided en a substantial center of each single cell layer, and a vibration spectrum of the acceleration pickup when the single cell layer was hammered by an impulse hammer was measured. A variety of settings for the measurement conform to JIS B 0908 (calibration method/basic concept for vibration and impact pickup). The obtained measurement spectrum was analyzed by an FET analyzer, and was converted into dimensions of the frequency and the acceleration. Averaging and smoothing were performed for the obtained frequency, and a vibration transmissibility spectrum was obtained.

An average of the vibration transmissibility spectrum from 10 to 300 Hz was defined as a vibration average value. With regard to a comparison reference, the spectrum obtained from Comparison example 1 was defined as the vibration average value thereof, and a ratio of the vibration average value of each of Examples and other Comparative examples with respect to the vibration average value of Comparative example 1 (the comparative reference) was defined as the average reduction amount. Hence, it is indicated that more excellent vibration isolation characteristics than those of the conventional structure are brought as a value of the average reduction amount becomes larger.

(Measurement of Resonance Shift Amount)

A maximum peak frequency which appeared on the most low-frequency side of the vibration transmissibility spectrum obtained in the measurement of the average reduction amount was obtained. Hereinafter, the maximum peak will be referred to as a first resonance peak.

(Measurement of Heat Risings and Heat Radiation Times)

A thermocouple was attached to each tab, a 10-C cycle test was performed for 60 minutes, and a maximum temperature reached by the battery component during the test was measured as the heat rising. Moreover, a temperature change in the case where, after the cycle test for 60 minutes, the current was stepped, and the battery component was left at room temperature was investigated, and a time taken for the temperature of the battery component to have returned to the room temperature was measured. The measurement was performed up to 60 minutes to the maximum, and when the temperature did not return to the room temperature within 60 minutes, "60 minutes or more" was written as a measurement result.

(Measurement Result)

In the measurement results shown in FIG. 18 and FIG. 19, the first resonance peak is referred to. In Comparative examples 1 and 2, the first resonance peaks were 60 Hz and 70 Hz, respectively, and were within a range of the number of vibrations that can be generated in the vehicle, that is, 100 Hz or less. Hence, it was understood that, in Comparative example 1, the bipolar battery resonated with the vehicle upon being mounted thereon. Meanwhile, in Examples 1 to 6, the first resonance peaks of all the bipolar batteries exceeded 100 Hz, and it was understood that the bipolar batteries did not resonate with the vehicle even if being mounted thereon.

Referring to vibration decrements in the measurement results shown in FIG. 18 and FIG. 19, the vibration decrements in all of Examples 1 to 6 were 32% or more, and it was understood that the vibrations could be significantly attenuated in Examples 1 to 6 as compared with Comparative example 1 with the conventional structure.

Referring to the heat risings in the measurement results shown in FIG. 18 and FIG. 19, while the heat rising in Comparative example 1 was 30 δT, and the heat rising in Comparative example 2 was 25 δT, the heat rising in the invention of this application was no higher than 20 δT.

The heat radiation times were referred to in the measurement results. While the heat radiation times were 60 minutes or more in Comparative examples 1 and 2, the heat radiation times were no longer than 15 minutes in Examples 1 to 6. From this result, it is understood that the heat radiation characteristics are significantly enhanced in the structure of the invention of this application as seen in Examples 1 to 6.

In the bipolar batteries of Examples 1 to 6, the single cell layers thereof are excellent in vibration isolation characteristics and heat radiation characteristics, and accordingly, are considered to be also excellent in battery output.

Example 7

Three-Layered Article of the Single Cell Layers of Example 1

SUS foil with a thickness of 15 μm was prepared as the current collector. $LiMnO_2$ (average particle diameter: 5 μm) was used as the positive electrode active material, and one formed into slurry, which was obtained by adding thereto N-methylpyrrolidone (NMP) as the slurry viscosity adjusting solvent, was applied on one surface of the SUS foil, followed by drying, whereby an active electrode active material layer with a thickness of 20 μm was formed. Next, hard carbon (average particle diameter: 6 μm; non-crystalline carbon material) was prepared as the negative electrode active material, and one formed into slurry, which was obtained by adding the NMP thereto, was applied on the other surface of the SUS foil, followed by drying, whereby a negative electrode active material layer with a thickness of 20 μm was formed.

Polyester nonwoven fabric (thickness: 15 μm; Shore A: 40) was impregnated with an oligomer of PVdF, which is a precursor of the crosslinked gel electrolyte, whereby a separator of the gel electrolyte was fabricated. Next, the above-described narrow-sense separator was immersed into a pregel solution composed of: 5 wt % of a monomer solution (copolymer of polyethylene oxide and polypropylene oxide) with an average molecular weight of 7500 to 9000, which is a precursor of an ion conductive polymer matrix; 95 wt % of PC+EC (PC:EC=1:1 (volume ratio)) as the electrolytic solution; 1.0 M of LiBETI; and a polymerization initiator (BDK: 0.01 to 1 mass % with respect to the precursor of the ion conductive polymer matrix that is a host polymer (polymer material of a polymer gel electrolyte). Then, the separator thus immersed into the pregel solution was sandwiched between quartz glass substrates, an ultraviolet ray was irradiated thereonto for 15 minutes, and the precursor was crosslinked, whereby a gel electrolyte composed of the separator containing the gel electrolyte was obtained.

Two pieces of SUS foil (thickness: 15 μm) were prepared as the end-portion current collectors, and the positive electrode active material layer or the negative electrode active material layer was formed only on one surface of each thereof in a similar way to the above-described method.

Next, these were combined so as to be formed into a structure in which three single cell layers were stacked, and a tab (thickness: 100 μm; width: 100 nm) of Al was vibration-welded to the end-portion current collector that contacts the positive electrode, and a tab (thickness: 100 μm; width: 100 mm) of Cu was vibration-welded to the end-portion current collector that contacts the negative electrode. An obtained stacked body attached with the tabs was sealed by a three-layer structured laminate material composed of a maleic acid-modified polypropylene film, SUS foil, and Nylon.

Next, a sealed body thus obtained was heated and crosslinked at 80° C. for two hours, and a bipolar battery composed by stacking three single cell layers was fabricated.

Example 8

Three-Layered Article of the Single Cell Layers of Example 2

A bipolar battery was fabricated in a similar way to Example 7 except that the thickness of each positive electrode active material layer was set at 28 μm, that the thickness of each negative electrode active material layer was set at 30 μm, and that the thickness of each separator was set at 27 μm.

Example 9

Three-Layered Article of the Single Cell Layers of Example 3

A bipolar battery was fabricated in a similar way to Example 7 except that the average particle diameter of the positive electrode active material was set at 8 μm, that graphite (crystalline carbon material) was used as the negative electrode active material, that the average particle diameter of each negative electrode active material was set at 9 μm, that polyolefin (Shore A: 80) was used as the skeleton of the gel electrolyte, that Cu—Al clad was used as each current collector, that the thickness of each positive electrode active material layer was set at 35 μm, that the thickness of each negative electrode active material layer was set at 37 µm, and that the thickness of each separator was set at 33 µm.

Example 10

Three-Layered Article of the Single Cell Layers of Example 4

A bipolar battery was fabricated in a similar way to Example 7 except that the average particle diameter of the positive electrode active material was set at 2 µm, that the average particle diameter of the negative electrode active material was set at 2 µm, that aramid (Shore A: 85) was used as the skeleton of the gel electrolyte, that the thickness of each positive electrode active material layer was set at 12 µm, that the thickness of each negative electrode active material layer was set at 12 µm, and that the thickness of each separator was set at 11 µm.

Example 11

Three-Layered Article of the Single Cell Layers of Example 5

A bipolar battery was fabricated in a similar way to Example 7 except that $LiNiO_2$ was used as the positive electrode active material, that the average particle diameter of the positive electrode active material was set at 0.8 µm, that the average particle diameter of the negative electrode active material was set at 0.8 µm, that aramid (Shore A: 85) was used as the skeleton of the gel electrolyte, that the thickness of each positive electrode active material layer was set at 6 µm, that the thickness of each negative electrode active material layer was set at 6 µm, that the thickness of each separator was set at 5 µm, and that the thickness of each current collector was set at 10 µm.

Comparative Example 3

Three-Layered Article of the Single Cell Layers of Comparative Example 1

A bipolar battery was fabricated in a similar way to Example 7 except that the thickness of each positive electrode active material layer was set at 40 µm, that the thickness of each negative electrode active material layer was set at 45 µm, and that the thickness of each separator was set at 50 µm.

Example 12

Three-Layered Article of Example 3-Example 2-Example 3

A bipolar battery was fabricated in a similar way to Example 1 except that the single cell layer fabricated in Example 2 was sandwiched by using a set of the end-portion current collector and the positive electrode active material layer and a set of the end-portion current collector and the negative electrode active material layer, each set of which was fabricated in Example 9.

Example 13

Three-Layered Article Including the Single Cell Layers of Example 5

A bipolar battery was fabricated in a similar way to Example 1 except that a single cell layer to be described below was sandwiched by using a set of the end end-portion current collector and the positive electrode active material layer and a set of the end-portion current collector and the negative electrode active material layer, each set of which was fabricated in Example 11.

The single cell layer was fabricated in a similar way to Example 1 except that $LiNiO_2$ was used as the positive electrode active material, that the average particle diameter of the positive electrode active material was set at 2 µm, that the average particle diameter of the negative electrode active material was set at 2 µm, that aramid (Shore A: 85) was used as the skeleton of the gel electrolyte, that the thickness of the positive electrode active material layer was set at 10 µm, that the thickness of the negative electrode active material layer was set at 12 µm, and that the thickness of the separator was set at 10 µm.

By using the bipolar batteries fabricated in Examples 7 to 13 and Comparative example 3, there were measured average reduction amounts therein, resonance shift amounts therein, heat risings therein, and heat radiation times therein. Details of respective methods of such measurements are as described above. However, the measurement of the heat risings was performed for the second layer located at the center of each of the bipolar batteries. Results of the measurements are shown in FIG. 20.

Example 14

10-Layered Article of the Single Cell Layers of Example 4

A bipolar battery was fabricated in a similar way to Example 7 except that the average particle diameter of the positive electrode active material was set at 2 µm, that the average particle diameter of the negative electrode active material was set at 2 µm, that aramid (Shore A: 85) was used as the skeleton of the gel electrolyte, that the thickness of each positive electrode active material layer was set at 12 µm, that the thickness of each negative electrode active material layer was set at 12 µm, that the thickness of each separator was set at 11 µm, that eight single cell layers and a pair of sets of the end-portion current collectors and the active materials were combined so as to be formed into a structure in which 10 single cell layers were stacked.

Comparative example 4

10-Layered Article of the Single Cell Layers of Comparative Example 1

A bipolar battery was fabricated in a similar way to Example 10 except that the thickness of each positive electrode active material layer was set at 40 µm, that the thickness of each negative electrode active material layer was set at 45 µm, that the thickness of each separator was set at 50 µm, that eight single cell layers and a pair of sets of the end-portion current collectors and the active material layers were combined so as to be formed into a structure in which 10 single cell layers were stacked.

By using the bipolar batteries fabricated in Example 14 and Comparative example 4, there were measured average reduction amounts therein, resonance shift amounts therein, heat risings therein, and heat radiation times therein. Details of respective methods of such measurements are as described above. However, the measurement of the heat risings was performed for the fifth layer located at the center of each of the bipolar batteries. Results of the respective measurements are shown in FIG. 21.

Example 15

100-Layered Article of the Single Cell Layers of Example 4

A bipolar battery was fabricated in a similar way to Example 7 except that the average particle diameter of the positive electrode active material was set at 2 μm, that the average particle diameter of the negative electrode active material was set at 2 μm, that aramid (Shore A: 85) was used as the skeleton of the gel electrolyte, that the thickness of each positive electrode active material layer was set at 12 μm, that the thickness of each negative electrode active material layer was set at 12 μm, that the thickness of each separator was set at 11 μm, that 98 single cell layers and a pair of sets of the end-portion current collectors and the active material layers were combined so as to be formed into a structure in which 100 single cell layers were stacked.

Comparative Example 5

100-Layered Article of the Single Cell Layers of Comparative Example 1

A bipolar battery was fabricated in a similar way to Example 7 except that the thickness of each positive electrode active material layer was set at 40 μm, that the thickness of each negative electrode active material layer was set at 45 μm, that the thickness of each separator was set at 50 μm, that 98 single cell layers and a pair of sets of the end-portion current collectors and the active material layers were combined so as to be formed into a structure in which 100 single cell layers were stacked.

By using the bipolar batteries fabricated in Example 15 and Comparative example 5, there were measured average reduction amounts therein, resonance shift amounts therein, heat risings therein, and heat radiation times therein. Details of respective methods of such measurements are as described above. However, the measurement of the heat risings was performed for the fiftieth layer located at the center of each of the bipolar batteries. Results of the respective measurements are shown in FIG. 22.

Figure 16:
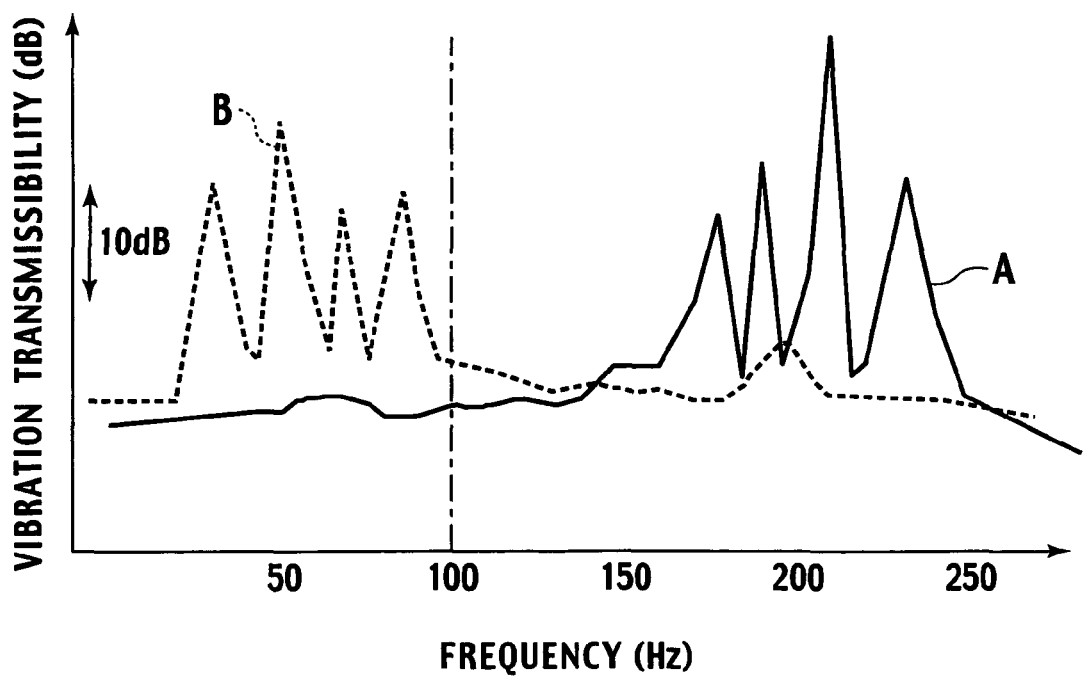
FIG. 16 is vibration transmissibility-frequency graphs of Example 15 and Comparative example 1.

FIG. 16 shows a frequency-vibration transmissibility curve (reference symbol A) of Example 15, and a frequency-vibration transmissibility curve (reference symbol B) of Comparative example 1. It is rated that, in a general vehicle, the peak of the vibration transmissibility does not occur in a range where the frequency exceeds 100 Hz. Example 15 (reference symbol A) has the peaks of the vibration transmissibility in the range where the frequency exceeds 100 Hz, and accordingly, is less likely to resonate with the vibrations of the vehicle at the time of being mounted on the vehicle, and is excellent in vibration isolation characteristics. Meanwhile, Comparative example 1 (reference symbol B) has the peaks of the vibration transmissibility in the range where the frequency is 100 Hz or less, and accordingly, is prone to resonate with the vibrations of the vehicle at the time of being mounted on the vehicle, and is prone to bring an output decrease owing to the vibrations.

Figure 17:
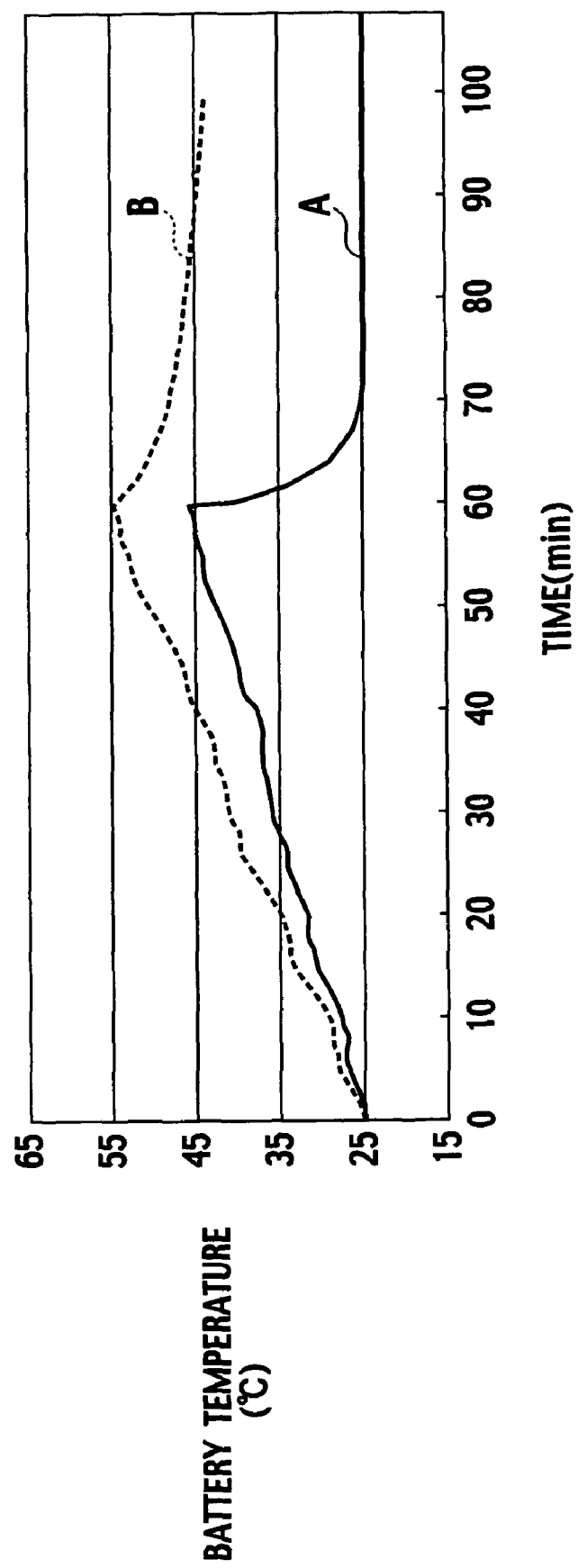
FIG. 17 is time-temperature graphs of Example 15 and Comparative example 1.

FIG. 17 shows a time-battery temperature curve (reference symbol A) of Example 15, and a time-battery temperature curve (reference symbol B) of Comparative example 1. Seeing FIG. 17, it is understood that there is a large difference between battery temperatures (highest reached temperatures) at 60 min. Example 15 has a structure excellent in heat radiation characteristics, and accordingly, the highest reached temperature thereof is lower than that of Comparative example 1. Specifically, the temperature rise of the battery is suppressed. Moreover, seeing the drop of the battery temperature after the current is stepped, while the temperature drop is gentle on and after the elapse of 60 min in Comparative example 1, the drop of the battery temperature is rapid in Example 15, and the battery temperature drops to the room temperature in approximately 10 minutes. From these facts, it can be said that the invention of this application is excellent in heat radiation characteristics.

INDUSTRIAL APPLICABILITY

In accordance with the present invention, the bipolar battery that has the improved heat radiation characteristics or vibration isolation characteristics and is excellent in output can be provided.

The invention claimed is:

1. A bipolar battery, comprising:
a bipolar electrode composed by forming a positive electrode active material layer on one surface of a current collector and forming a negative electrode active material layer on the other surface of the current collector; and
a separator composed to be stacked alternately with the bipolar electrode,
wherein, in a single cell layer composed by including the positive electrode active material layer, the separator and the negative electrode active material layer, which are adjacent to one another, a thickness of the separator is 0.68 times or more to less than 1.0 times a thickness of the positive electrode active material layer, and is 0.68 times or more to less than 1.0 times a thickness of the negative electrode active material layer, wherein
a plurality of the single cell layers are stacked on one another, and
the hardness Shore A of the separator of at least one layer differs from the hardnesses Shore A of the separators of the other layers.

2. The bipolar battery according to claim 1, wherein, in the single cell layer, the thickness of the separator is 0.75 to 0.95 times the thickness of the positive electrode active material layer, and is 0.75 to 0.95 times the thickness of the negative electrode active material layer.

3. The bipolar battery according to claim 1, wherein a thickness of the single cell layer is 10 to 85 μm.

4. The bipolar battery according to claim 3, wherein the thickness of the single cell layer is 20 to 50 μm.

5. The bipolar battery according to claim 1, wherein a thickness of at least one type selected from the group consisting of the positive electrode active material layer, the separator and the negative electrode active material layer is 35 μm or less.

6. The bipolar battery according to claim 1, wherein the thickness of the separator is 20 μm or less.

7. The bipolar battery according to claim 1, wherein the separator contains at least one type selected from the group consisting of polyester resin, aramid resin and polyolefin resin.

8. The bipolar battery according to claim 1, wherein air permeability of the separator is 10 to 400 sec/10 cc.

9. The bipolar battery according to claim 1, wherein a tortuosity of the separator is 0.5 to 2.0.

10. The bipolar battery according to claim 1, wherein a hardness Shore A of the separator is 20 to 110.

11. A bipolar battery, comprising:

a bipolar electrode composed by forming a positive electrode active material layer on one surface of a current collector and forming a negative electrode active material layer on the other surface of the current collector; and a separator composed to be stacked alternately with the bipolar electrode, wherein, in a single cell layer composed by including the positive electrode active material layer, the separator and the negative electrode active material layer, which are adjacent to one another, a thickness of the separator is 0.68 times or more to less than 1.0 times a thickness of the positive electrode active material layer, and is 0.68 times or more to less than 1.0 times a thickness of the negative electrode active material layer, wherein three or more of the single cell layers are stacked on one another, and the hardness Shore A of the separator included in the single cell layer disposed at a center of the bipolar battery is the smallest of all the hardnesses Shore A of the separators included in the other single cell layers.

* * * * *